(12) United States Patent
Moran et al.

(10) Patent No.: US 11,673,526 B1
(45) Date of Patent: Jun. 13, 2023

(54) ONE-PIECE WOVEN AIRBAG WITH INTEGRALLY WOVEN INDICIA

(71) Applicant: ZF Passive Safety Systems US Inc., Washington, MI (US)

(72) Inventors: Dylan Moran, Rochester Hills, MI (US); Bruce Hill, Bloomfield Hills, MI (US); Avadhoot Paranjpe, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/582,032

(22) Filed: Jan. 24, 2022

(51) Int. Cl.
| | |
|---|---|
| *B60R 21/235* | (2006.01) |
| *B60R 21/232* | (2011.01) |
| *B32B 5/02* | (2006.01) |
| *B32B 5/26* | (2006.01) |

(52) U.S. Cl.
CPC ............ *B60R 21/235* (2013.01); *B32B 5/024* (2013.01); *B32B 5/263* (2021.05); *B60R 21/232* (2013.01); *B32B 2255/02* (2013.01); *B32B 2307/41* (2013.01); *B32B 2605/08* (2013.01); *B60R 2021/23509* (2013.01); *B60R 2021/23547* (2013.01)

(58) Field of Classification Search
CPC .......... B60R 2021/23547; B60R 2021/23509; B60R 21/235; B60R 21/232; B32B 5/02; B32B 5/024; B32B 5/26; B32B 5/262; B32B 5/263; B32B 2255/02; B32B 2307/41; B32B 2605/08; D03D 1/02; D03D 1/0011; D10B 2505/124; G06K 19/06028
USPC ....................................... 280/730.2
See application file for complete search history.

(56) References Cited

U.S. PATENT DOCUMENTS

| | | | |
|---|---|---|---|
| 2013/0187368 A1* | 7/2013 | Donais | B60R 21/231 280/743.1 |
| 2014/0099016 A1* | 4/2014 | Adams | B60R 21/23 382/141 |
| 2017/0037546 A1* | 2/2017 | Lau | G06K 19/027 |
| 2020/0125906 A1* | 4/2020 | Hill | B60R 21/213 |
| 2021/0094501 A1* | 4/2021 | Kakimoto | B60R 21/237 |

FOREIGN PATENT DOCUMENTS

KR 20150078872 A * 7/2015

* cited by examiner

*Primary Examiner* — Keith J Frisby
(74) *Attorney, Agent, or Firm* — Tarolli, Sundheim, Covell & Tummino L.L.P.

(57) ABSTRACT

An airbag and a method for manufacturing the airbag. The airbag is manufactured by weaving yarns to form a one-piece woven (OPW) airbag having inflatable portions and non-inflatable portions. The non-inflatable portions are woven with varying weave patterns so as to form recesses in the surface of the airbag in the form of an indicia.

24 Claims, 5 Drawing Sheets

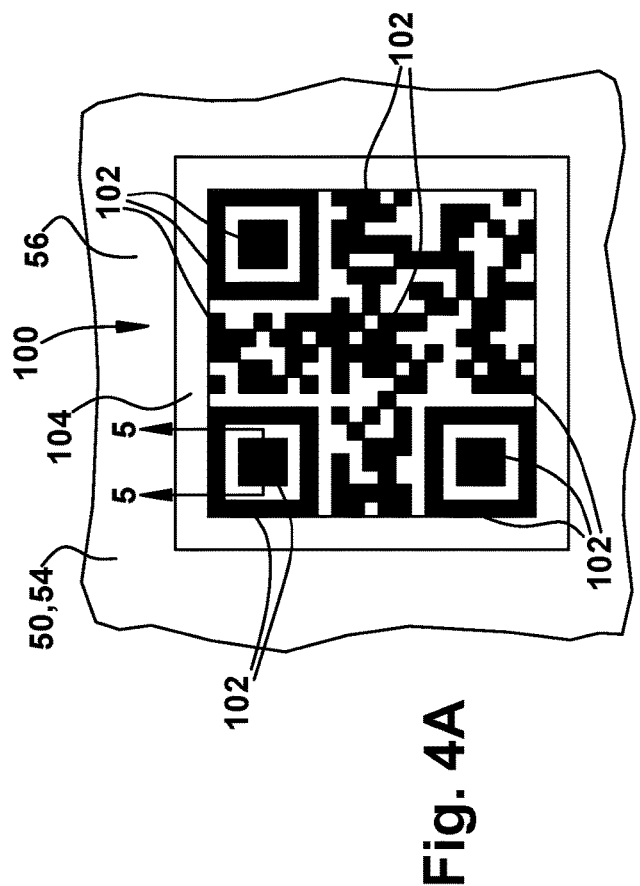
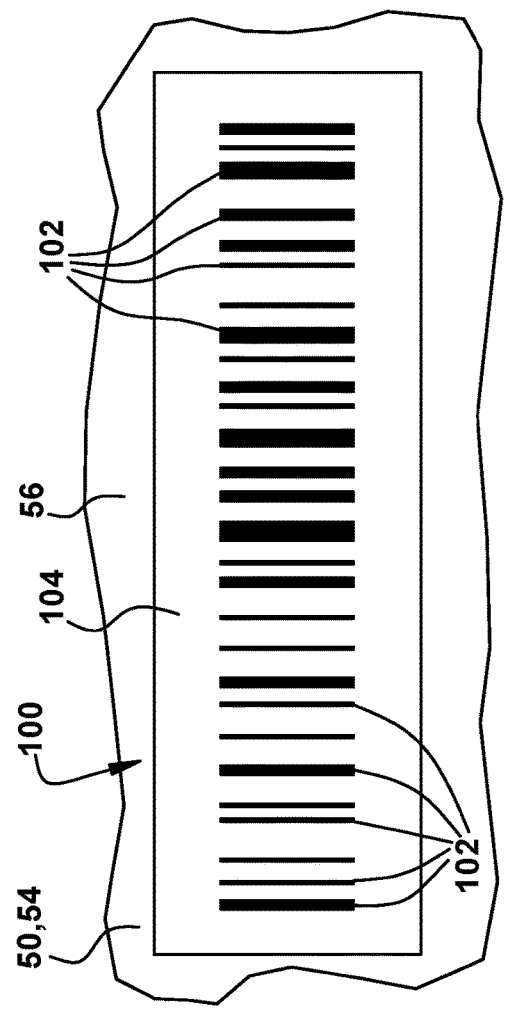
Fig. 4A
Fig. 4B

ONE-PIECE WOVEN AIRBAG WITH INTEGRALLY WOVEN INDICIA

TECHNICAL FIELD

The present invention relates generally to an apparatus for helping to protect an occupant of a vehicle. More particularly, the present invention relates to a one-piece woven (OPW) airbag woven on a water-jet loom.

BACKGROUND OF THE INVENTION

It is known to inflate an inflatable vehicle occupant protection device to help protect a vehicle occupant in the event of a vehicle collision. Examples of inflatable vehicle occupant protection devices include driver and passenger frontal airbags, side airbags, curtain airbags, inflatable seat belt airbags, inflatable knee bolster airbags, and inflatable head liner airbags.

Airbags can have a variety of constructions. One particular construction is a one-piece woven (OPW) construction in which overlying panels are woven simultaneously to form the airbag structure. According to an OPW airbag construction, an inflatable volume of the airbag is between the layers. The panels are woven together to form single layer connections or seams that help delineate the inflatable volume of the OPW airbag.

Curtain airbags are configured to help protect vehicle occupants in the event of side impact and rollover crash events. Curtain airbags are typically rolled-up or folded-up about a roll/fold axis to form an elongated airbag package that is installed via mounting tabs spaced along its length. Curtain airbags are typically installed along a roof rail of the vehicle and, when inflated, deploy downward, unrolling and/or unfolding to a deployed position between the occupant and a side structure of the vehicle.

To function properly, curtain airbags must be installed properly. One aspect of proper curtain airbag installation has to do with avoiding twists in the airbag. Proper curtain airbag deployment can be negatively affected if the airbag package is twisted along its length, i.e., about the roll/fold axis. It therefore can be desirable to provide indicia on the curtain airbag that aids in proper non-twisted installation. The indicia can additionally indicate information, such as batch numbers, part numbers, serial numbers, production dates, etc. so, to this extent, it may be desirable to provide indicia on any inflatable vehicle occupant protection device.

SUMMARY

A method for providing indicia on a one piece woven (OPW) airbag includes weaving yarns to form an OPW airbag structure in which the indicia is formed as a pattern in the woven structure of the airbag fabric. The indicia is formed as one or more recesses in an exterior surface of the OPW airbag fabric. The recess(es) are formed via differentials in the thickness of the OPW airbag fabric, which are created by different weave patterns.

According to one aspect, the OPW airbag fabric can be coated at least in the area of the indicia. In this instance, the coating in the recesses can be thicker than the coating on the surrounding portions of the OPW airbag fabric. Because of this, and owing to the translucence/opacity of the coating, a visual contrast between the indicia and the surrounding areas can be achieved. This, in turn, can allow for machine reading, such as optical scanning of the indicia.

According to one aspect, a method for manufacturing an airbag includes weaving yarns to form a one-piece woven (OPW) airbag having inflatable portions and non-inflatable portions. The method also includes weaving a non-inflatable portion of the OPW airbag with varying weave patterns so as to form recesses in the surface of the airbag in the form of an indicia.

According to another aspect, weaving the non-inflatable portion can include weaving areas of a first weave pattern and areas of a second weave pattern, different than the first weave pattern. The non-inflatable portion can have a first thickness in the area of the first weave pattern and a second thickness, greater than the first thickness, in the area of the second weave pattern. The first weave pattern can be configured and arranged in the form of the indicia. The second weave pattern can be configured and arranged to at least partially define boundaries of the indicia.

According to another aspect, the method can also include the step of applying a coating to the exterior surface of the OPW airbag so that the coating fills the recesses of the indicia. The coating can thereby have a thickness that is greater in the areas of the indicia than the areas surrounding the indicia. The coating can also have a translucence selected so as to define a gradient between the indicia and the areas surrounding the indicia sufficient to allow for machine reading.

According to another aspect, the first weave pattern can be configured to promote flow of the coating into interstices between yarns of the woven fabric in the areas of the first weave pattern.

According to another aspect, the opacity of the coating in the area of the indicia can be greater than the opacity of the coating in the areas surrounding the indicia.

According to another aspect, the coating can include a pigment that increases its opacity.

According to another aspect, the indicia can be a barcode or a quick-read (QR) code.

According to another aspect, the airbag can be a curtain airbag. The indicia can be an anti-twist indicia for helping to ensure proper installation of the curtain airbag in a vehicle.

According to another aspect, the first weave pattern can be a single layer weave pattern, and the second weave pattern can be a two-layer weave pattern.

According to another aspect, the first weave pattern can be a basket weave pattern and the second weave pattern can be a plain weave pattern.

According to another aspect, the non-inflatable portion of the OPW airbag can be a non-inflatable edge portion of the OPW airbag.

According to another aspect, the non-inflatable portion of the OPW airbag can be a mounting tab of the OPW airbag.

According to another aspect, an airbag includes a one-piece woven (OPW) airbag having inflatable portions and non-inflatable portions. Non-inflatable portions of the OPW airbag include areas woven with weave patterns that vary so as to form recesses in a surface of the airbag. The recesses are in the form of an indicia.

According to another aspect, the non-inflatable portion can include areas of a first weave pattern and areas of a second weave pattern, different than the first weave pattern. The non-inflatable portion can have a first thickness in the area of the first weave pattern and a second thickness, greater than the first thickness, in the area of the second weave pattern. The first weave pattern can be configured and arranged in the form of the indicia. The second weave pattern can be configured and arranged to at least partially define boundaries of the indicia.

According to another aspect, the airbag can include a coating applied to the exterior surface of the OPW airbag. The coating can fill the recesses forming the indicia. The coating can thereby have a thickness that is greater in the areas of the indicia than the areas surrounding the indicia. The coating can have a translucence selected so as to define a gradient between the indicia and the areas surrounding the indicia sufficient to allow for machine reading.

According to another aspect, the opacity of the coating in the area of the indicia can be greater than the opacity of the coating in the areas surrounding the indicia.

According to another aspect, the first and second weave patterns can be configured such that the coating flows into interstices between yarns of the woven fabric in the areas of the first weave pattern to a greater extent than the coating flows into interstices between yarns of the second weave pattern.

According to another aspect, the coating can include a pigment that increases its opacity.

According to another aspect, the indicia can be a barcode or a quick-read (QR) code.

According to another aspect, the airbag can include a curtain airbag and the indicia can include an anti-twist indicia for helping to ensure proper installation of the curtain airbag in a vehicle.

According to another aspect, the first weave pattern can be a single layer weave pattern, and the second weave pattern can be a two-layer weave pattern.

According to another aspect, the first weave pattern can be a basket weave pattern and the second weave pattern can be a plain weave pattern.

According to another aspect, the non-inflatable portion of the OPW airbag can be a non-inflatable edge portion of the OPW airbag.

According to another aspect, the non-inflatable portion of the OPW airbag can be a mounting tab of the OPW airbag.

BRIEF DESCRIPTION OF THE DRAWINGS

FIGS. 4A and 4B are plan views illustrating examples of indicia formed in the OPW construction of the curtain airbag.

DETAILED DESCRIPTION

Figure 1:
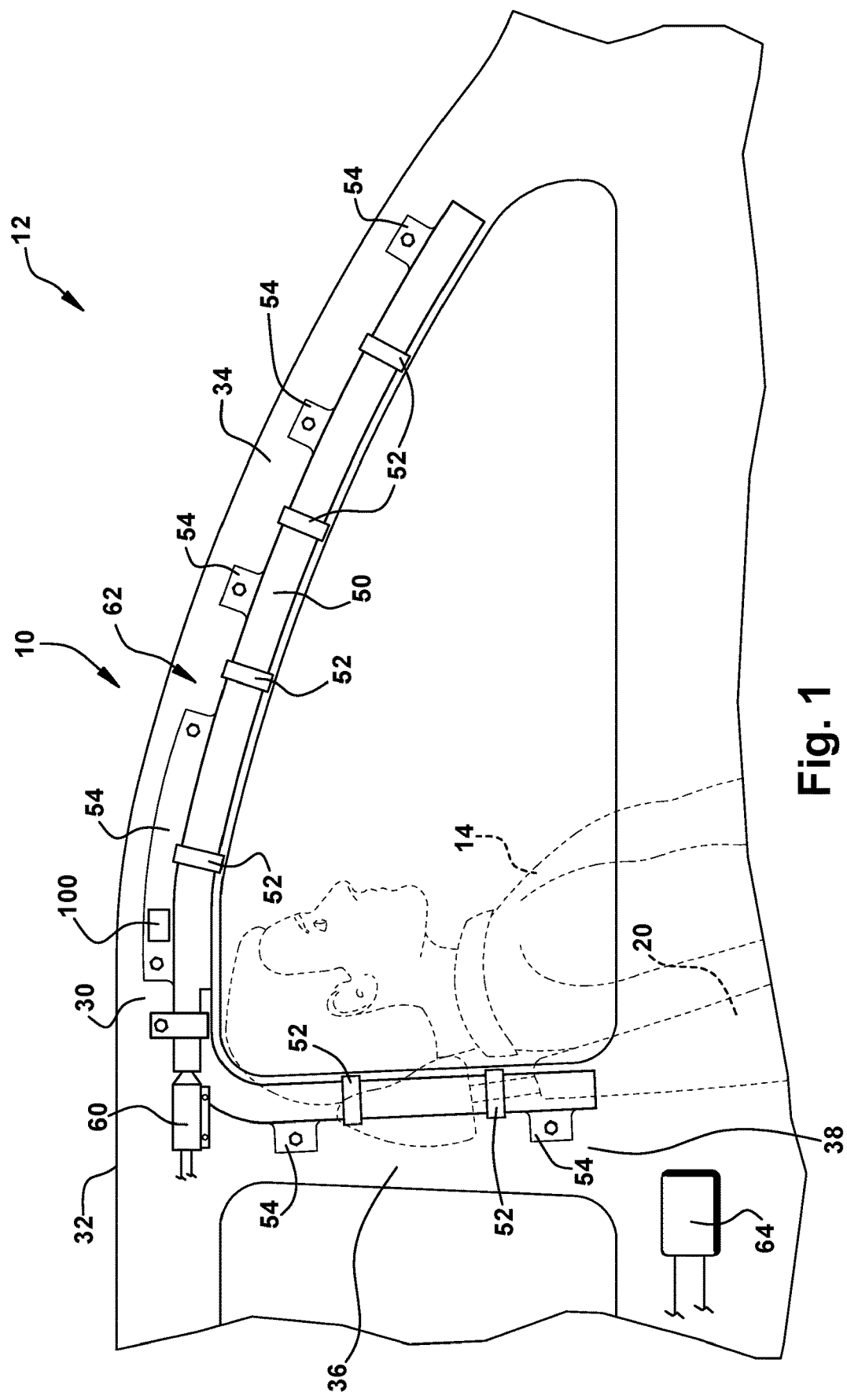
FIG. 1 is a schematic view of a vehicle including a vehicle safety system according to an example configuration of the invention.
Figure 2:
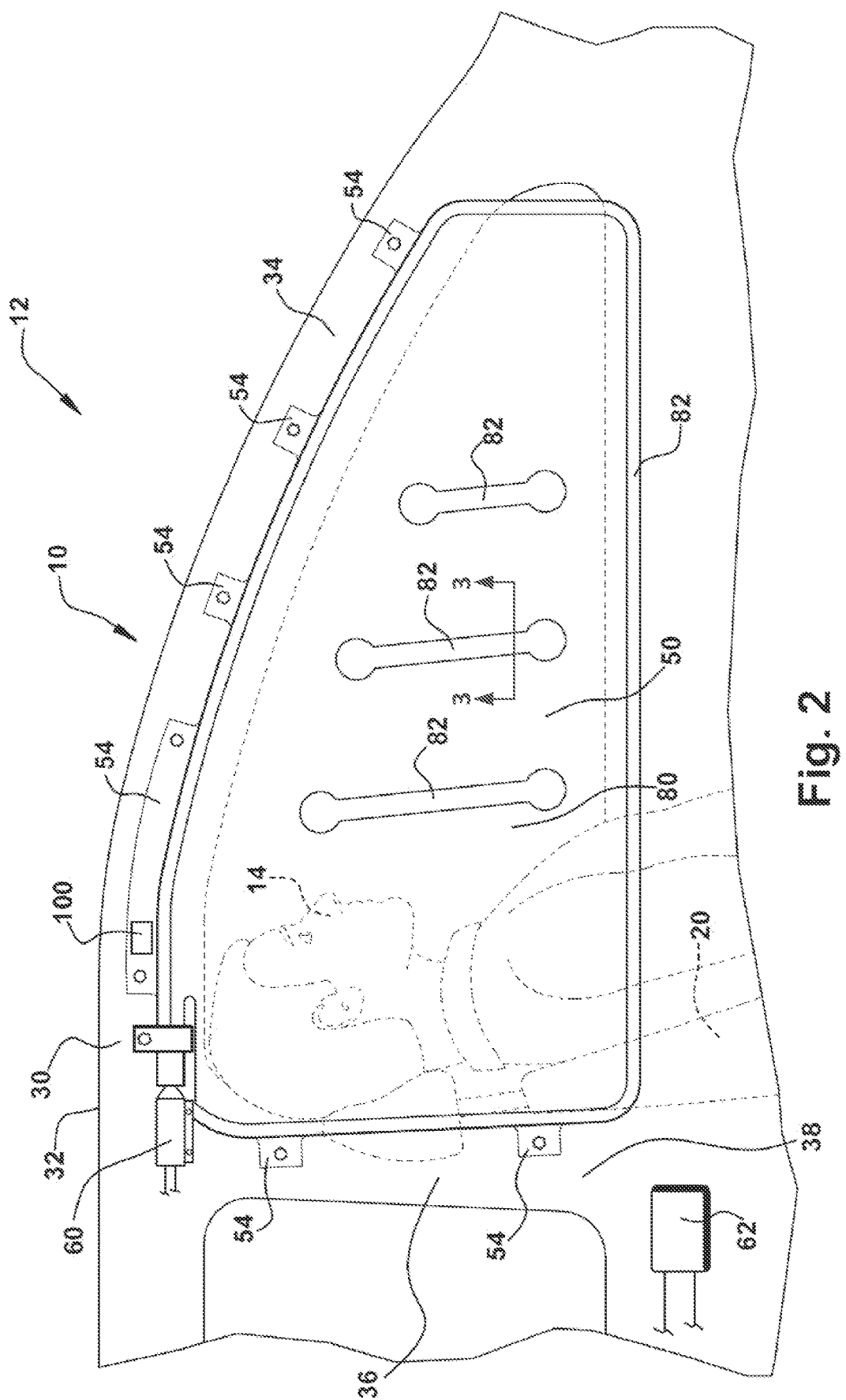
FIG. 2 is a side view of the vehicle illustrating a curtain airbag portion of the vehicle safety system in an inflated and deployed condition.

FIGS. 1 and 2 illustrate a vehicle safety system 10 for helping to protect an occupant 14 of a vehicle 12. The vehicle safety system 10 includes an inflatable vehicle occupant protection device in the form of a curtain airbag 50. The curtain airbag 50 has a stored condition, illustrated in FIG. 1, in which the airbag is deflated, rolled-up and/or folded-up, and packaged for installation in the vehicle 12. In the stored condition of the example curtain airbag 50 illustrated in FIG. 1, the airbag is secured to a vehicle roof rail 30 and extends along the roof 32. The curtain airbag 50 can also be secured to, and extend along, an A-pillar 34 of the vehicle 12.

To maintain the packaging of the curtain airbag 50, i.e., to maintain the curtain airbag in the rolled and/or folded configuration for installation, airbag wraps 52, such as tape, can be looped around the airbag at spaced locations along its length. Alternative structures (not shown), such as a sheath, can also be used to package the curtain airbag 50 for installation. The curtain airbag 50 can also include one or more mounting tabs 54 spaced along its length. The mounting tabs 54 can facilitate the use of fasteners, such as screws or other threaded fasteners, alone or aided by clips, for securing the airbag to the roof rail 30.

In the example configuration of FIGS. 1 and 2, the curtain airbag 50 extends along the roof rail 30 from the A-pillar 34 to a B-pillar 36, thereby helping to protect the occupant 14 of a first row seat 20. The curtain airbag 50 could, however, have a different extent. For example, the curtain airbag 50 could extend from the A-pillar 34 to a C-pillar (not shown) and thereby help protect occupants of first and second row seats.

The vehicle safety system 10 also includes an inflator 60 that is actuatable to provide inflation fluid for inflating the curtain airbag 50. The inflator 60 can be assembled with the packaged curtain airbag 50, forming an airbag module 62 configured for installation in the vehicle 12 as a whole. The safety system 10 further includes an airbag controller 64 that is configured to actuate the inflator 60 in response to a sensed crash event, such as a side impact or rollover, for which occupant protection is desired.

Upon sensing a crash event, the airbag controller 64 provides electrical signal(s) over lead wires to the inflator 60, which causes the inflator to be actuated in a known manner and discharge fluid under pressure into the inflatable volume of the curtain airbag 50. The curtain airbag 50 inflates under the pressure of the inflation fluid from the inflator 60 away from the roof 32 to a position between a side structure 38 of the vehicle 12 and any occupants 14 of adjacent seats. The curtain airbag 50, when inflated, helps protect the vehicle occupant(s) by absorbing the energy of impacts with the airbag and helping to distribute the impact energy over a large area of the airbag.

The curtain airbag 50 has a one-piece woven (OPW) construction in which two-layer portions of the OPW construction form overlying airbag panels 80, and single layer portions of the OPW construction define seams 82. The seams 82 help delineate inflatable portions of the curtain airbag 50 in which an inflatable volume 84 is defined between the panels 80 and bounded by the seams.

Figure 3:
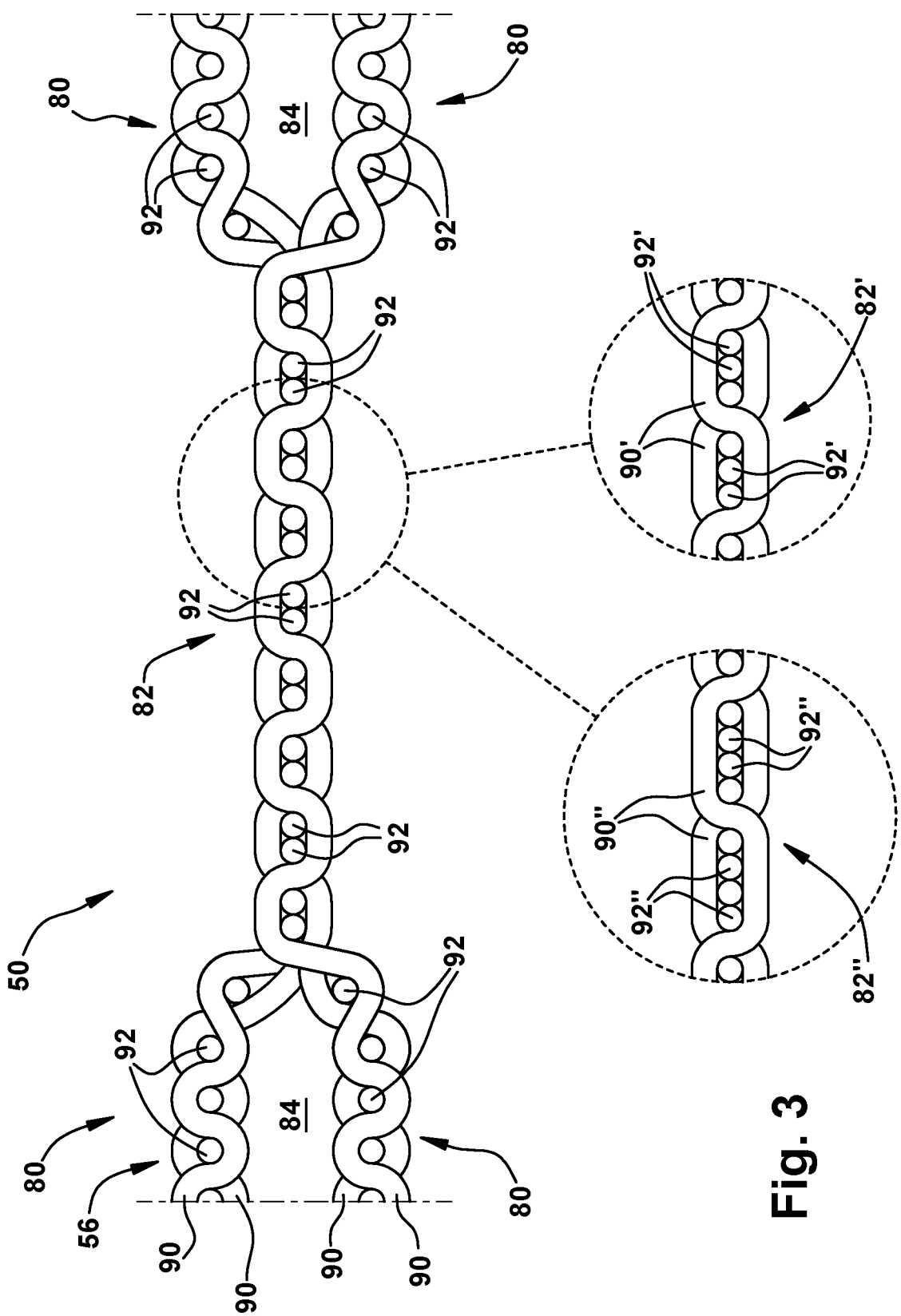
FIG. 3 is a sectional view taken generally along line 3-3 in FIG. 2, illustrating an OPW construction of a portion of the curtain airbag.

Referring to FIG. 3, the OPW curtain airbag 50 is constructed of a plurality of warp yarns, or "ends", indicated at 90 and a plurality of weft yarns, or "picks," indicated at 92. The warp yarns 90 and the weft yarns 92 are oriented perpendicular to each other and woven together by interlacing the warp yarns 90 with the weft yarns 92 in an alternating or "up and down" fashion. In the example configuration of FIG. 3, double layer portions of the OPW curtain airbag 50 forming the overlying panels 80 are woven in a one-by-one (1×1) weave pattern referred to in the art as a "plain weave" pattern. In this plain weave pattern, single warp yarns 90 are interlaced around single weft yarns 92, as shown.

Single layer portions of the OPW curtain airbag 50 forming the seams 82 include the yarns from both of the overlying panels 80. To account for this increased number of yarns, the seams 82 can have a more open weave pattern, such as a basket weave, in which the warp and weft yarns 90, 92 are interlaced in groups of two or more, referred to as a basket weave or Panama weave. Thus, for example, as shown at the seam 82 in FIG. 3, the warp yarns 90 are passed in pairs over and under pairs of weft yarns 92 in an alternating fashion. This is referred to as a two-by-two (2×2) basket weave. Alternatively, as shown at 82', the yarns 90', 92' can be woven in a 3×3 basket weave. As another alternative, as shown at 82", the yarns 90", 92" can be woven in a 4×4 basket weave. Further alternatives, such as a 2×3 or 3×4 basket weave, can also be implemented.

The curtain airbag 50 also includes indicia 100 (see FIGS. 1 and 2) that can serve a variety of purposes. For example, the indicia can include information, such as information, such as batch numbers, part numbers, serial numbers, production dates, etc. The indicia 100 can also be used to verify proper installation of the curtain airbag module 62. Specifically, according to one example configuration, the indicia 100 can be used to verify that the rolled/folded curtain airbag 50 was not twisted during installation.

In the example configuration of the curtain airbag 50, the indicia 100 is formed on one of the mounting tabs 54. The indicia 100 could, however, be formed at other locations on the airbag. For example, the indicia 100 could be formed along outer margins, i.e., the outer seams 82, of the inflatable volume, or even outside those margins, e.g., along the selvage of the woven material.

The indicia 100 can be configured to be machine readable so that the information provided and/or so that the proper installation verification can be automated. The indicia 100 can, for example, be designed for optical scanning recognition. The indicia 100 can, for example, include or be in the form of a barcode, as shown in FIG. 4A, or a quick-readable (QR) code, as shown in FIG. 4B. In both cases, the dark areas are the machine readable portion 102 of the indicia 100, which are superimposed on the light portions, which serve as a background 104. Alternative indicia, such as letters, numbers, and logos, can also be implemented.

Advantageously, the indicia 100 is formed by variations or differentiation in the weave pattern of the OPW curtain airbag construction. In both example configurations of the indicia 100, the machine readable portions, i.e., the machine readable portions 102 in FIGS. 4A and 4B, have a different weave pattern than the surrounding background portions 104. More specifically, the machine readable portions 102 are woven to have a thickness that is less than the thickness of the surrounding background portions 104. This variation in thickness is achieved by variations in the weaves forming the portions 102, 104. As a result, the machine readable portions 102 are recessed into the surrounding background portions 104. Since the background portions 104 can be contiguous with the portion of the curtain airbag 50 into which they are formed, the machine readable portions 102 of the indicia 100 are recessed into the outer surface 56 of the airbag.

By way of example, one manner in which this recessed configuration of the indicia 100 can be formed is to weave the machine readable portions 102 as single layer portions and the background portions 104 as double layer portions. This can be done, for example, using any of the weave combinations illustrated in FIG. 3. The background portions 104 can be double layer portions, and the machine readable portions 102 can be single layer portions. As shown in FIG. 3, the single layer portion of the seam 82 has a thickness that is less than the adjacent double layer portions 80. This same construction can be used to form the recessed indicia 100. Therefore, example configurations of the indicia 100 include double layer plain woven (1×1) background portions 104 with single layer basket woven (e.g., 2×2, 3×3, 4×4, 2×3, 3×4, etc.) machine readable portions 102. The result of these configurations is that the machine readable portions 102 are recessed into the surrounding background portions 104 and the surface 56 of the curtain airbag 50.

To allow for optical scanning to occur, there needs to be some contrast between the machine readable portions 102 and the background portions 104. Since airbag yarns 92, 92 are typically all the same color, this contrast can be lacking. Adding ink to the indicia 100 to provide contrast would work, but would destroy the advantageous nature of having it woven into the fabric. One of the main advantages of the configuration is, after all, eliminating a separate manufacturing step of adding an indicia to the already woven airbag, and the associated costs, in terms of both time and materials.

The disclosed configuration takes advantage of the fact that the airbag has an OPW construction, which allows for forming the indicia 100 as part and parcel to the construction of the curtain airbag 100 itself. Doing so adds very little in terms of time and materials. It is therefore clear that adding those costs back into the equation through the use of ink or other additional materials and/or manufacturing steps, does not make sense.

Advantageously, the configuration of the indicia 100 disclosed herein takes advantage of another manufacturing process inherent to the manufacture of the OPW curtain airbag 50, namely, coating. OPW curtain airbags are typically coated with a material, such as silicone or urethane, to help improve the airtightness of the bag, in order to help ensure adequate bag inflation and pressurization duration. The configuration of the OPW curtain airbag 50 disclosed herein takes advantage of this coating process to help improve the contrast between the machine readable portions 102 and the surrounding background portions 104.

Figure 5:
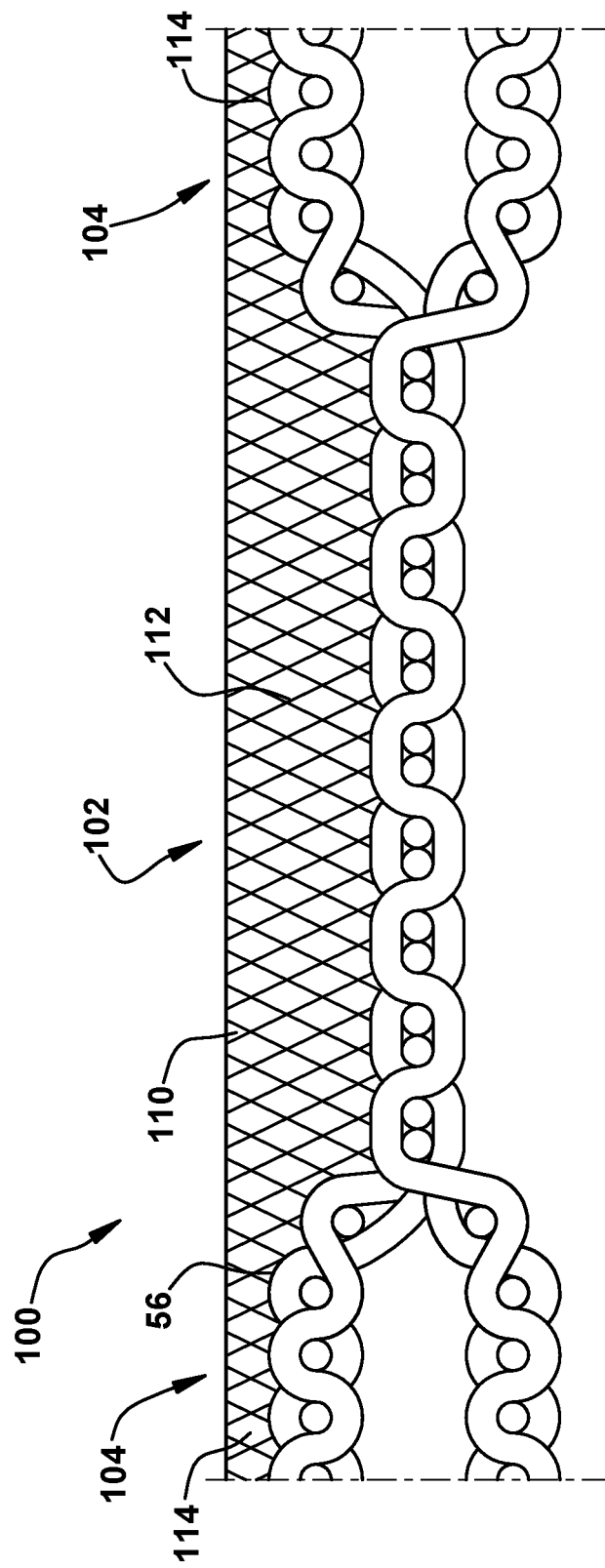
FIG. 5 is a sectional view taken generally along line 5-5 in FIG. 4A, illustrating an OPW construction of a portion of the curtain airbag.

Referring to FIG. 5, the coating 110 is applied to the entire surface 56 upon which the indicia 100 is formed. As a result, due to the variations in thickness between the machine readable portions 102 and the background portions 104, the thickness of the coating 110 is also variable. More specifically, the coating 110 has a thickness in the area of the machine readable portions 102, as indicated generally by shading at 112, that is greater than the thickness of the coating on the background portions 104, as indicated generally at 114.

Additionally, the coating 110, when applied, flows into the interstices of the woven fabric, i.e., the spaces between the yarns of the fabric. For the two layer portions of the airbag 50, the tightly woven plain weave inhibits or limits the degree to which the coating can flow into the interstices. The basket weave of the single layer portions, however, leaves space for the coating to penetrate and flow into the interstices. As a result, not only is the coating 110 thicker in the areas of the machine readable portions 102, it also penetrates further into the interstices of the fabric in those portions. This furthers the extent to which the coating 110 is heavier/thicker in the areas of the machine readable portions 102, which increases the opacity of the coating in those areas, making the indicia 100 more readily readable.

The coating 110 is not totally translucent and can, for example include a pigment that gives the coating a certain degree of opacity. The coating portion 112 that follows the machine readable portion 102 has an opacity that is greater than that of the coating portion 114 that covers the surrounding background 104. As a result, there is an optical gradient between the machine readable portion 102 and the background portion 104 that is capable of being optically scanned and read. Again, the indicia 100 applied to the curtain airbag 50 is inherent to its construction and requires no additional steps.

What have been described above are example configuration(s). It is, of course, not possible to describe every conceivable combination or arrangement of components and their resulting configurations, but one of ordinary skill in the art will recognize that many further combinations of components and resulting configurations are possible. For example, the indicia described above with regard to the example curtain airbag configurations could be applied to any airbag construction (e.g., frontal airbags, side airbags, etc.). Accordingly, this description is intended to embrace all such configurations and any alterations, modifications, or variations that fall within the scope of the following claims.

Having described the invention, the following is claimed:

1. A method for manufacturing an airbag, comprising:
   weaving yarns to form a one-piece woven (OPW) airbag having inflatable portions and non-inflatable portions;
   weaving a non-inflatable portion of the OPW airbag with varying weave patterns so as to form recesses in the surface of the airbag, the recesses being in the form of an indicia.

2. The method recited in claim 1, wherein weaving the non-inflatable portion comprises weaving areas of a first weave pattern and areas of a second weave pattern, different than the first weave pattern, wherein the non-inflatable portion has a first thickness in the area of the first weave pattern and a second thickness, greater than the first thickness, in the area of the second weave pattern, wherein the first weave pattern is configured and arranged in the form of the indicia, and wherein the second weave pattern is configured and arranged to at least partially define boundaries of the indicia.

3. The method recited in claim 2, wherein the first weave pattern is a single layer weave pattern, and the second weave pattern is a two-layer weave pattern.

4. The method recited in claim 3, wherein the first weave pattern is a basket weave pattern and the second weave pattern is a plain weave pattern.

5. The method recited in claim 1, further comprising the step of applying a coating to the exterior surface of the OPW airbag so that the coating fills the recesses of the indicia, the coating thereby having a thickness that is greater in the areas of the indicia than the areas surrounding the indicia, the coating having a translucence selected so as to define a gradient between the indicia and the areas surrounding the indicia sufficient to allow for machine reading.

6. The method recited in claim 5, wherein weaving the non-inflatable portion comprises weaving areas of a first weave pattern and areas of a second weave pattern, different than the first weave pattern, wherein the non-inflatable portion has a first thickness in the area of the first weave pattern and a second thickness, greater than the first thickness, in the area of the second weave pattern, wherein the first weave pattern is configured and arranged in the form of the indicia, and wherein the second weave pattern is configured and arranged to at least partially define boundaries of the indicia, wherein the method further comprises the step of configuring the first and second weave patterns such that the coating flows into interstices between yarns of the woven fabric in the areas of the first weave pattern to a greater extent than the coating flows into interstices between yarns of the second weave pattern.

7. The method recited in claim 5, wherein the opacity of the coating in the area of the indicia is greater than the opacity of the coating in the areas surrounding the indicia.

8. The method recited in claim 5, wherein the coating comprises a pigment that increases its opacity.

9. The method recited in claim 1, wherein the indicia comprises one of a barcode and a quick-read (QR) code.

10. The method recited in claim 1, wherein the airbag comprises a curtain airbag and the indicia comprises an anti-twist indicia for helping to ensure proper installation of the curtain airbag in a vehicle.

11. The method recited in claim 1, wherein the non-inflatable portion of the OPW airbag comprises a non-inflatable edge portion of the OPW airbag.

12. The method recited in claim 1, wherein the non-inflatable portion of the OPW airbag comprises a mounting tab of the OPW airbag.

13. An airbag, comprising:
   a one-piece woven (OPW) airbag having inflatable portions and non-inflatable portions;
   wherein a non-inflatable portion of the OPW airbag comprises areas woven with weave patterns that vary so as to form recesses in a surface of the airbag; and
   wherein the recesses are in the form of an indicia.

14. The airbag recited in claim 13, wherein the non-inflatable portion comprises areas of a first weave pattern and areas of a second weave pattern, different than the first weave pattern, wherein the non-inflatable portion has a first thickness in the area of the first weave pattern and a second thickness, greater than the first thickness, in the area of the second weave pattern, wherein the first weave pattern is configured and arranged in the form of the indicia, and wherein the second weave pattern is configured and arranged to at least partially define boundaries of the indicia.

15. The airbag recited in claim 14, wherein the first weave pattern is a single layer weave pattern, and the second weave pattern is a two-layer weave pattern.

16. The airbag recited in claim 15, wherein the first weave pattern is a basket weave pattern and the second weave pattern is a plain weave pattern.

17. The airbag recited in claim 13, further comprising a coating applied to the exterior surface of the OPW airbag, the coating filling the recesses forming the indicia, the coating thereby having a thickness that is greater in the areas of the indicia than the areas surrounding the indicia, wherein the coating has a translucence selected so as to define a gradient between the indicia and the areas surrounding the indicia sufficient to allow for machine reading.

18. The airbag recited in claim 17, wherein the opacity of the coating in the area of the indicia is greater than the opacity of the coating in the areas surrounding the indicia.

19. The airbag recited in claim 17, wherein the non-inflatable portion comprises areas of a first weave pattern and areas of a second weave pattern, different than the first weave pattern, wherein the non-inflatable portion has a first thickness in the area of the first weave pattern and a second thickness, greater than the first thickness, in the area of the second weave pattern, wherein the first weave pattern is configured and arranged in the form of the indicia, and wherein the second weave pattern is configured and arranged to at least partially define boundaries of the indicia, wherein the first and second weave patterns are configured such that the coating flows into interstices between yarns of the woven fabric in the areas of the first weave pattern to a greater extent than the coating flows into interstices between yarns of the second weave pattern.

20. The airbag recited in claim 17, wherein the coating comprises a pigment that increases its opacity.

21. The airbag recited in claim 13, wherein the indicia comprises one of a barcode and a quick-read (QR) code.

22. The airbag recited in claim 13, wherein the airbag comprises a curtain airbag and the indicia comprises an anti-twist indicia for helping to ensure proper installation of the curtain airbag in a vehicle.

23. The airbag recited in claim 13, wherein the non-inflatable portion of the OPW airbag comprises a non-inflatable edge portion of the OPW airbag.

24. The airbag recited in claim 13, wherein the non-inflatable portion of the OPW airbag comprises a mounting tab of the OPW airbag.

\* \* \* \* \*